(12) United States Patent
Koyama

(10) Patent No.: US 7,986,732 B2
(45) Date of Patent: Jul. 26, 2011

(54) MOVING PICTURE COMPRESSION/ENCODING METHOD CONVERSION DEVICE AND MOVING PICTURE COMMUNICATION SYSTEM

(75) Inventor: Kazuhiro Koyama, Tokyo (JP)

(73) Assignee: NEC Corporation, Tokyo (JP)

( * ) Notice: Subject to any disclaimer, the term of this patent is extended or adjusted under 35 U.S.C. 154(b) by 1692 days.

(21) Appl. No.: 10/552,398

(22) PCT Filed: Mar. 19, 2004

(86) PCT No.: PCT/JP2004/003794
§ 371 (c)(1), (2), (4) Date: Oct. 7, 2005

(87) PCT Pub. No.: WO2004/093457
PCT Pub. Date: Oct. 28, 2004

(65) Prior Publication Data
US 2006/0215757 A1    Sep. 28, 2006

(30) Foreign Application Priority Data
Apr. 10, 2003    (JP) ................................. 2003-106614

(51) Int. Cl.
H04N 7/12    (2006.01)
(52) U.S. Cl. ................................. 375/240.12
(58) Field of Classification Search .......... 382/232–251; 375/240.01–240.29; 348/441
See application file for complete search history.

(56) References Cited

U.S. PATENT DOCUMENTS

| | | | |
|---|---|---|---|
| 5,512,953 A * | 4/1996 | Nahumi | 348/441 |
| 6,407,680 B1 | 6/2002 | Lai et al. | |
| 6,483,851 B1 | 11/2002 | Neogi | |
| 6,487,249 B2 * | 11/2002 | Kim et al. | 375/240.21 |
| 7,266,148 B2 * | 9/2007 | Kim | 375/240.03 |
| 2003/0054769 A1 | 3/2003 | Kalluri | |
| 2005/0226325 A1 * | 10/2005 | Dei et al. | 375/240.12 |
| 2006/0165180 A1 * | 7/2006 | Koyama et al. | 375/240.23 |

FOREIGN PATENT DOCUMENTS

CN    1254151 A    5/2000
(Continued)

OTHER PUBLICATIONS

Hanamuea Kameyama, "Digital Hoso Kyokasho (Jo)", IDG Japan, pp. 311-312 (Feb. 1, 2003).

(Continued)

*Primary Examiner* — Sherali Ishrat
(74) *Attorney, Agent, or Firm* — Dickstein Shapiro LLP

(57) ABSTRACT

To enable to output, from a transcoder, a coded bit stream which can be decoded and reproduced by a receiving side moving image decoding device, irrespective of whether a coding tool or the like of the moving image compression-coding system being used in the receiving side moving image decoding device. A coding control unit outputs coding tool control information based on receiving decoding information received from the receiving side moving image decoding device. A DCT, a quantizer and a variable length encoder change operations based on the coding tool control information. The coding control unit outputs coding start information based on the receiving decoding information. A transcode start judging unit outputs a moving image signal based on the coding start information so as to operate to start transcoding.

19 Claims, 5 Drawing Sheets

FOREIGN PATENT DOCUMENTS

| | | |
|---|---|---|
| EP | 0 872 990 A1 | 10/1998 |
| JP | 9-153820 | 6/1997 |
| JP | 10-51779 | 2/1998 |
| JP | 2000-59788 | 2/2000 |
| JP | 2000-232646 | 8/2000 |
| JP | 2000-253404 | 9/2000 |
| JP | 2001-61142 | 3/2001 |
| JP | 2002-044622 A | 2/2002 |
| WO | WO 02/05558 A1 | 1/2002 |

OTHER PUBLICATIONS

PCT International Search Resort dated Jul 6, 2004.

Warabino, Takayuki et al.:"Video Transcoding Proxy for 3Gwireless Mobile Internet Access": IEEE Communications Magazine, vol. 38, No. 10, Oct. 1, 2000, pp. 66-71.

Vetro, Anthony, et al.; "Video Transcoding Architectures and Techniques: An Overview"; IEEE Signal Processing Magazine, vol. 20, No. 2, Mar. 1, 2003, pp. 18-29.

Lei, Zhijun, et al.; "Video Transcoding Gateway for Wireless Video Access"; Canadian Conference on Electrical and Computer Engineering, Montreal, Canada, May 4-7, 2003, vol. 3, pp. 1775-1778.

Shekhar, Raj, et al.; "Mutual Information-Based Rigid and Nonrigid Registration of Ultrasound Volumes"; IEEE Transactions on Medical Imaging, vol. 21, No. 1, Jan. 1, 2002, pp. 9-22.

\* cited by examiner

MOVING PICTURE COMPRESSION/ENCODING METHOD CONVERSION DEVICE AND MOVING PICTURE COMMUNICATION SYSTEM

TECHNICAL FIELD

The present invention relates to a moving image compression-coding system conversion device and a moving image communication system. In particular, the present invention relates to a moving image compression-coding system conversion device and a moving image communication system used for connecting a transmission side moving image coding device and a receiving side moving image decoding device to each other. Note that a moving image compression-coding system conversion device is also called as a transcoder.

BACKGROUND ART

Recently, as systems for efficiently transmitting moving image signals in a narrow band by compression-coding, there are known moving image coding systems such as H.261, H.263 and MPEG (Moving Picture Experts Group)-4. These moving image compression-coding systems are standardized internationally by ITU-T (International Telecommunication Union Telecommunication Standardization Sector) recommendations or ISO (International Organization of Standardization)/IEC (International Electrotechnical Commission).

These moving image compression-coding systems such as H.261, H.263 and MPEG-4 have different characteristics, respectively. Therefore, in a case where a transmission side moving image coding device and a receiving side moving image decoding device adopt different moving image compression-coding systems, when moving image signals are transmitted/received between the transmission side moving image coding device and the receiving side moving image decoding device, there is required a moving image compression-coding system conversion device, that is, a transcoder.

The plural moving image compression-coding systems described above have such similar aspects that inter-frame prediction by motion compensation, DCT (Discrete Cosine Transform) and quantization, and variable-length coding using Huffman code are performed. However, bit streams, compression-coded actually, are largely different in the respective moving image compression-coding systems.

Therefore, a transcoder includes a decoder and an encoder. A transcoder decodes a compression-coded moving image signal, received from a transmission side moving image coding device by the decoder, and then re-encodes the decoded signal by the encoder, and outputs the compression-coded moving image signal to a receiving side moving image decoding device.

The conventional systems having the configuration described above have the following problems.

That is, when a coded bit stream is converted as described above, a transcoder obtains information about a moving image compression-coding system adopted by a receiving side moving image decoding device. In a case where compression-coding is performed by using MPEG-4, for example, as a moving image compressing coding system, the transmission side moving image coding device performs compression-coding by using at least one of plural parameters (coding tools, etc.) included in DCI (Decoder Configuration Information) of MPEG-4. On the other hand, the receiving side moving image decoding device performs decoding by using at least one of plural parameters (coding tools, etc.) included in the DCI of MPEG-4.

Relating to MPEG-4 described above, in order to prevent the quality of decoded moving image from being deteriorated significantly due to a bit error caused when the coded bit stream is transmitted for example, coding tools such as Resync Marker, Data Partitioning, and Reversible VLC (Variable Length Codes) are stipulated in the recommendations mentioned above.

A conventional transcoder described above could not obtain information about parameters for the receiving side moving image decoding device to perform decoding. Therefore, when a conventional transcoder is used, there has been a problem that a coded bit stream converted by the transcoder cannot be decoded and reproduced by the receiving side moving image decoding device due to the difference in the parameters (coding tools, etc.) of moving image compression-coding systems between the transcoder and the receiving side moving image decoding device.

Further, as a characteristic of the moving image compression-coding, intra-frame coding is performed to the first frame of a moving image signal, and inter-frame prediction coding is performed to the subsequent frames generally. If the first frame cannot be decoded and reproduced correctly, the receiving side moving image decoding device cannot decode and reproduce subsequent, inter-frame prediction coded frames correctly. Alternatively, if intra-frame coding is performed periodically for example, the receiving side moving image decoding device cannot decode and reproduce the moving image signal until data of the intra-frame coded frame is inputted.

That is, there has been a problem that when a coded bit stream outputted from the transcoder is inputted in the receiving side moving image decoding device earlier than the time when the receiving side moving image decoding device starts decoding and reproduction of the coded bit stream, the receiving side moving image decoding device cannot decode and reproduce the first, intra-frame coded frame correctly. As described above, there has been a problem that once decoding and reproduction of an intra-frame coded frame are failed, decoding and reproduction of the subsequent, inter-frame prediction coded frames cannot be performed until decoding and reproduction of the next, intra-frame coded frame are performed successfully.

An object of the present invention is to provide a moving image compression-coding system conversion device (transcoder) capable of decoding and reproducing moving image signals in receiving side moving image decoding devices even when parameters used for decoding in the receiving side moving image decoding devices are different in the respective receiving side moving image decoding devices, or even when the parameters are changed in the receiving side moving image decoding devices.

Another object of the present invention is to provide a moving image compression-coding system conversion device (transcoder) capable of outputting a coded bit stream in which the first frame is intra-frame coded and the subsequent frames are inter-frame prediction coded, enabling a receiving side moving image decoding device to decode and reproduce a coded bit stream correctly right after starting decoding and reproduction of the coded bit stream.

DISCLOSURE OF THE INVENTION

In order to achieve the objects described above, a moving image compression-coding system conversion device, according to the present invention, mutually converts a coded bit stream between a transmission side moving image coding device and a receiving side moving image decoding device having different moving image compression-coding systems. The moving image compression-coding system conversion device comprises: a decoding unit for decoding a compression-coded bit stream outputted from the transmission side moving image coding device; a coding control unit for setting a parameter for compression-coding based on receiving decoding information outputted from the receiving side moving image decoding device; and a coding unit for compression-coding the moving image signal decoded by the decoding unit by using the parameter for compression-coding outputted from the coding control unit.

It is preferable that the coding unit start operation when control information outputted from the coding control unit is inputted, perform intra-frame coding to a first frame after starting the operation, and perform inter-frame prediction coding to subsequent frames.

It is preferable that the moving image compression-coding system conversion device further include a judging unit which starts operation when the receiving decoding information outputted from the receiving side moving image decoding device is inputted, and outputs the moving image signal decoded in the decoding unit to the coding unit.

It is preferable that the moving image compression-coding system conversion device further include a decoding control unit instead of the coding control unit or in addition to the coding control unit, and that the decoding control unit set a parameter for decoding based on the coding transmission information outputted from the transmission side moving image coding device; and that the decoding unit decode the compression-coded bit stream outputted from the transmission side coding device by using the parameter for compression-coding outputted from the decoding control unit.

The moving image compression coding system conversion device according to the present invention can be incorporated in a moving image communication system. The moving image communication system incorporating the moving image compression coding system conversion device of the present invention is so constructed as to include: a transmission side moving image coding device and a receiving side moving image decoding device having different moving image compression systems; and the moving image compression-coding system conversion device described above for mutually converting a coded bit stream between the transmission side moving image coding device and the receiving side moving image decoding device.

BEST MODE FOR CARRYING OUT THE INVENTION

Hereinafter, embodiments of the present invention will be described in detail with reference to the drawings.

Figure 1:
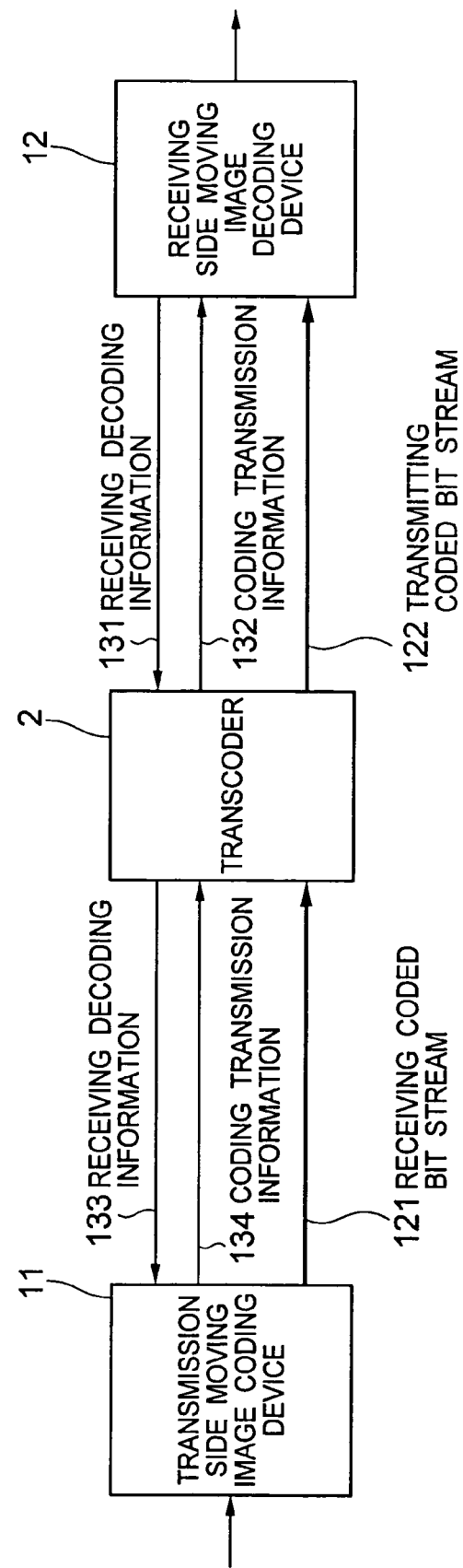
FIG. 1 is a block diagram showing a moving image communication system to which the present invention is applied.

First, referring to FIG. 1, a moving image communication system in which a moving image compression-coding system conversion device according to the present invention is incorporated. The moving image communication system shown includes a transmission side moving image coding device 11, a moving image compression-coding system conversion device (hereinafter referred to as a transcoder) 2 according to the present invention, and a receiving side moving image decoding device 12. The transmission side moving image coding device 11 and the receiving side moving image decoding device 12 are different in their moving image compression-coding systems. On that premise, the transcoder 2 according to the present invention mutually converts a coded bit stream between the transmission side moving image coding device and the receiving side moving image decoding device having different moving image compression systems. These elements will be explained in detail.

The transmission side moving image coding device 11 inputs a moving image signal, and performs compression-coding to the moving image signal by using a moving image compression-coding system such as ITU-T recommendation H.261 or H.263, or ISO/IEC recommendation MPEG-4, and outputs the compression-coded moving image signal to the transcoder 2, described later, as a receiving coded bit stream 121.

When moving image compression-coding systems are different in the transmission side moving image coding device 11 and in the receiving side moving image decoding device 12 described later, the transcoder 2 converts the receiving coded bit stream 121 outputted from the transmission side moving image coding device 11 into a transmitting coded bit stream 122 which can be decoded and reproduced by the receiving side moving image decoding device 12, and outputs the transmitting coded bit stream 122 to the receiving side moving image decoding device 12.

The receiving side moving image decoding device 12 decodes the transmitting coded bit stream 122 outputted from the transcoder 2, and outputs a moving image signal.

The transcoder 2 and the receiving side moving image decoding device 12 are so configured as to transmit receiving decoding information 131 and coding transmission information 132 by using a protocol such as ITU-T recommendation H.245, or SDP (Session Description Protocol) standardized internationally as IETF (Internet Engineering Task Force) recommendation RFC (Request for Comments) 2327.

The transmission side moving image coding device 11 and the transcoder 2 are so configured as to transmit receiving decoding information 133 and coding transmission information 134 by using a protocol such as H.245 or SDP as described above.

Next, referring to FIGS. 1 and 2, the overall configuration and operation of a moving image communication system according to a first embodiment of the present invention will be explained in detail.

Figure 2:
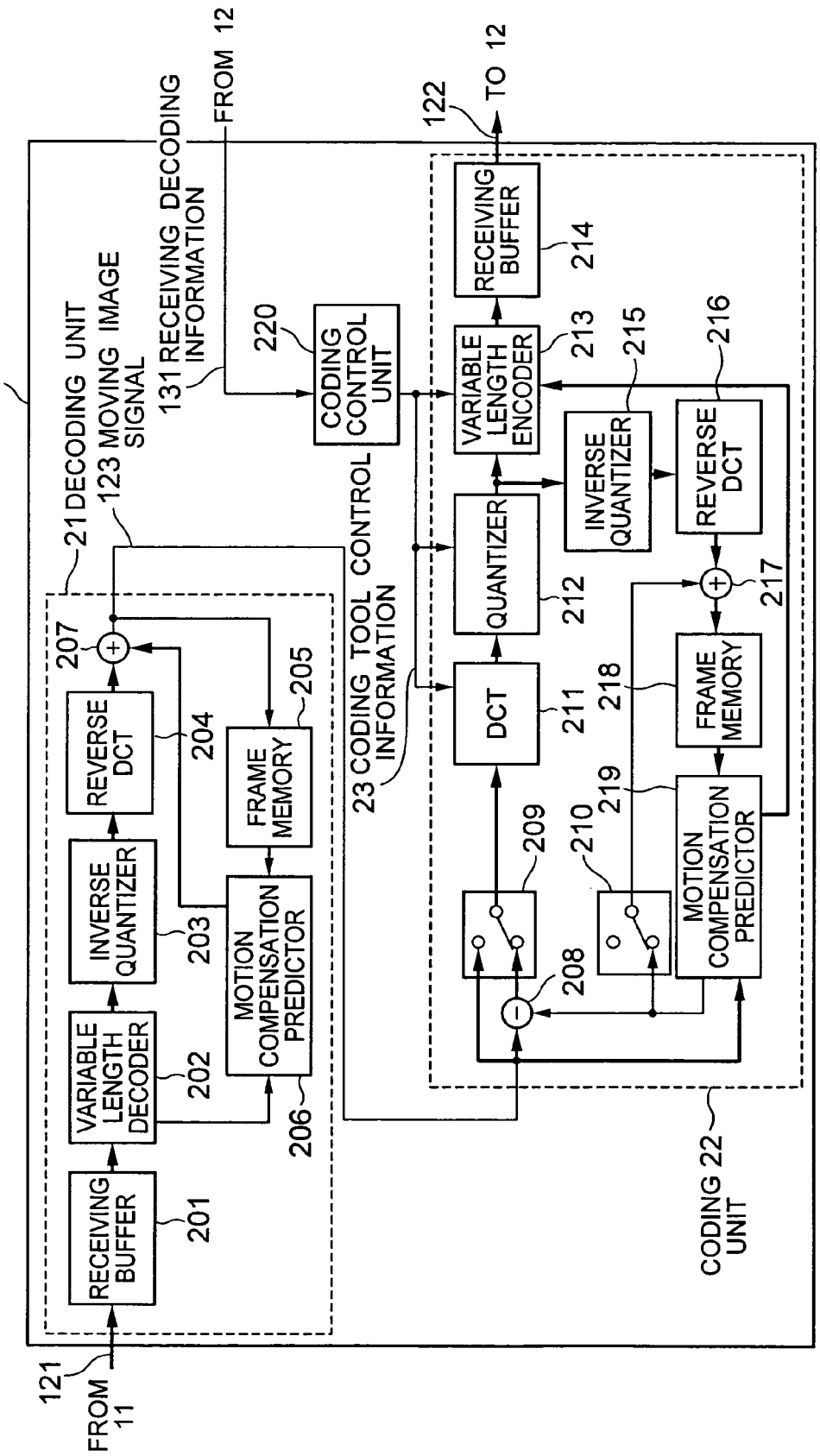
FIG. 2 is a block diagram showing a moving image compression-coding system conversion device (transcoder) according to a first embodiment of the present invention.

FIG. 2 shows the detailed configuration of the transcoder 2 according to the first embodiment of the present invention. The transcoder 2 includes a decoding unit 21, a coding unit 22, and a coding control unit 220.

First, operation of the decoding unit 21 of the transcoder 2 will be explained.

In the decoding unit 21 shown in FIG. 2, a receiving buffer 201 temporarily stores the receiving coded bit stream 121 which is compression-coded by using a moving image compression-coding system such as ITU-T recommendation H.261 or H.263 or ISO/IEC recommendation MPEG-4 and outputted from the transmission side moving image coding device 11. Then, the receiving buffer 201 outputs the stored receiving coded bit stream to a variable length decoder 202.

The variable length decoder 202 performs variable length decoding to the receiving coded bit stream 121 outputted from the receiving buffer 201. Then, the variable length decoder 202 outputs the decoded quantization conversion coefficient to an inverse quantizer 203.

The inverse quantizer 203 performs computation of inverse quantization to the quantization conversion coefficient outputted from the variable length decoder 202. Then, the inverse quantizer 203 outputs the inversely quantized conversion coefficient to a reverse DCT (Discrete Cosine Transformer) 204.

The reverse DCT 204 performs computation of inverse discrete cosine conversion to the conversion coefficient outputted from the inverse quantizer 203. Then, the reverse DCT 204 outputs the converted moving image signal to an adder 207.

A frame memory 205 stores a moving image signal 123 outputted from the adder 207 described later.

A motion compensation predictor 206 uses the coded parameter outputted from the variable length decoder 202, and performs motion compensation prediction to the moving image signal 123 stored in the frame memory 205. Then, the motion compensation predictor 206 outputs a moving image signal, obtained as a result of performing the motion compensation prediction, to the adder 207.

The adder 207 adds the moving image signal outputted from the reverse DCT 204 and the moving image signal outputted from the motion compensation predictor 206. Then, the adder 207 outputs the added moving image signal 123 to each of the frame memory 205, a subtracter 208, an intra-frame/inter-frame prediction coding selector switch 209, and a motion compensation predictor 219.

Next, the coding unit 22 of the transcoder 2 will be explained.

In the coding unit 22 shown in FIG. 2, the subtracter 208 subtracts a moving image signal outputted from the motion compensation predictor 219 described later from the moving image signal 123 outputted from the adder 207, so as to calculate the prediction residual which is the difference thereof.

The intra-frame/inter-frame prediction coding selector switches 209 and 210 switch the coding method of each frame between the intra-frame coding and inter-frame prediction coding, based on prescribed timings or information supplied from the outside.

A DCT (Discrete Cosine Transformer) 211 performs computation of discrete cosine conversion to the moving image signal 123 outputted from the adder 207 or the prediction residual moving image signal outputted from the subtracter 208 through the intra-frame/inter-frame prediction coding selector switch 209. Then, the DCT 211 outputs the conversion coefficient obtained as a result of the computation to a quantizer 212.

The quantizer 212 performs calculation of quantization to the conversion coefficient outputted from the DCT 211. Then, the quantizer 212 outputs the quantization conversion coefficient obtained as a result of the computation to a variable length encoder 213 and an inverse quantizer 215, respectively.

The variable length encoder 213 performs variable length coding to the quantization conversion coefficient outputted from the quantizer 212 and to a coding parameter outputted from the motion compensation predictor 219 described later. Then, the variable length encoder 213 outputs the obtained coded bit stream to a transmission buffer 214.

The transmission buffer 214 temporarily stores the coded bit stream outputted from the variable length encoder 213. Then, the transmission buffer 214 outputs the stored transmitting coded bit stream 122 to the receiving side moving image decoding device 12.

The inverse quantizer 215 performs computation of inverse quantization to the quantization conversion coefficient outputted from the quantizer 212. Then, the inverse quantizer 215 outputs the inversely quantized conversion coefficient to the reverse DCT 216.

The reverse DCT 216 performs reverse discrete cosine conversion to the conversion coefficient outputted from the inverse quantizer 215. Then, the reverse DCT 216 outputs the converted moving image signal to an adder 217.

The adder 217 adds the moving image signal outputted from the reverse DCT 216 and the moving image signal outputted from the motion compensation predictor 219 described later through the intra-frame/inter-frame prediction coding selector switch 210. Then, the adder 217 outputs the added moving image signal to a frame memory 218.

The frame memory 218 stores the moving image signal outputted from the adder 217.

The motion compensation predictor 219 performs motion detection and motion compensation prediction to the moving image signal 123 outputted from the adder 207 based on the moving image signal stored in the frame memory 218. Then, the motion compensation predictor 219 outputs the moving image signal obtained as a result of the motion compensation prediction to the subtracter 208 and to the intra-frame/inter-frame prediction coding selector switch 210. Further, the motion compensation predictor 219 outputs a coding parameter to the variable length encoder 213.

The coding control unit 220 selects a coding tool (parameter) or the like used in the receiving side moving image decoding device 12, based on the receiving decoding information 131 transmitted from the receiving side moving image decoding device 12. Then, based on the result of selection, the coding control unit 220 outputs coding tool control information 23 to the DCT 211, the quantizer 212 and the variable length encoder 213, respectively.

The DCT 211, the quantizer 212 and the variable length encoder 231 receive the coding tool control information 23 from the coding control unit 220, and corresponding to the parameter for compression-coding included in the coding tool control information 23, change the operations.

As parameters for compression-coding included in the coding tool control information 23 outputted from the coding control unit 220, if the moving image compression-coding system adopted by the receiving side moving image decoding device 12 is MPEG-4 for example, at least one of a plurality of parameters included in DCI such as a value of aspect_ratio_info or vop_time_increment_resolution, in addition to whether at least one of coding tools such as Resync Marker, Data Partitioning, and Reversible VLC being used, is used.

The transcoder 2 according to the first embodiment of the present invention uses a parameter for compression-coding that the receiving side moving image decoding device 12 can decode and reproduce based on the receiving decoding information 131 received from the receiving side moving image decoding device 12, and performs compression-coding to the bit stream 121 which is formed by decoding the receiving coded bit stream 121 received from the transmission side moving image coding device 11, and transmits the compression coded bit stream to the receiving side moving image decoding device 12 as a transmitting coded bit stream 122.

Therefore, according to the first embodiment of the present invention, the receiving side moving image decoding device 12 can decode and reproduce the compression coded bit stream received from the transcoder 2 securely, irrespective of the use of a parameter used for decoding.

In the explanation above, it is premised that the transmission side moving image coding device 11 and the receiving side moving image decoding device 12 have different compression-coding systems. However, there may be a case where the transmission side moving image coding device 11 and the receiving side moving image decoding device 12 adopt the same compression-coding system such as MPEG-4, and parameters for the compression-coding are different.

Even in such a case, in the embodiment of the present invention, information about parameters for compression-coding is transmitted/received among the transcoder 2, the transmission side moving image coding device 11 and the receiving side moving image decoding device 12. Therefore, it is possible to flexibly cope with the case where the moving image compression-coding system is same but parameters for the compression-coding are different.

Further, in a case where a different parameter is adopted in each receiving side moving image decoding device 12, or in a case where a parameter is changed, it is possible to cope with flexibly.

Further, in the first embodiment of the present invention, the transcoder 2 can select a parameter used for decoding by the receiving side moving image decoding device 12, so it is possible to reduce necessary processing or secured memory for coping with all parameters.

Next, referring to FIGS. 1 and 3, a transcoder 3 according to a second embodiment of the present invention will be explained in detail.

Figure 3:
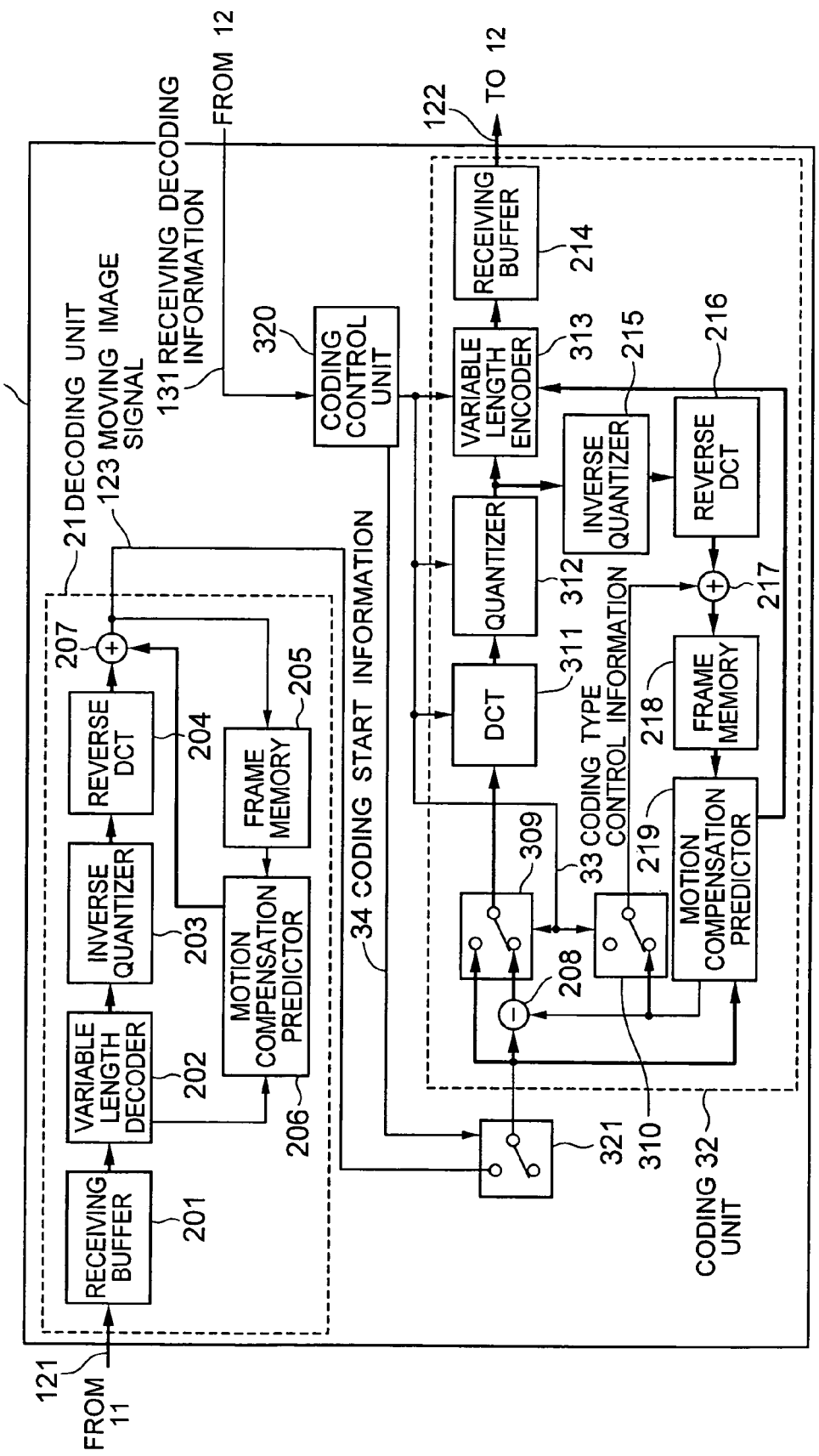
FIG. 3 is a block diagram showing a moving image compression-coding system conversion device (transcoder) according to a second embodiment of the present invention.

FIG. 3 shows the detailed configuration of the transcoder 3 in the second embodiment of the present invention. The transcoder 3 shown in FIG. 3 is different from that of the first embodiment shown in FIG. 2 in the configurations and operations of the coding unit and the coding control unit as described later. Further, the transcoder 3 further includes a transcoding start judging unit (judging unit) 321. Other configuration operates similarly to the transcoder 2 of the first embodiment shown in FIG. 2. Therefore, the coding unit and the coding control unit shown in FIG. 3 are denoted by reference numerals 32 and 320 respectively, different from those shown in FIG. 2. Note that those having similar functions to those of the transcoder 2 of the first embodiment are denoted by the same reference numerals, and the explanations thereof are omitted for simplification.

In the coding unit 32 shown in FIG. 3, operations (configurations) of intra-frame/inter-frame prediction coding selector switches, a DCT, a quantizer and a variable length encoder are different from those shown in FIG. 2 as described later. Other configurations operate similar to those of the coding unit 22 shown in FIG. 2. Therefore, the intra-frame/inter-frame prediction coding selector switches are denoted by reference numerals 309 and 310, which are different from those shown in FIG. 2, and the DCT, the quantizer and the variable length encoder are denoted by reference numerals 311, 312 and 313, respectively, which are different from those shown in FIG. 2.

The coding control unit 320 outputs coding type control information 33 to the intra-frame/inter-frame prediction coding selector switches 309 and 310, the DCT 311, the quantizer 312 and the variable length encoder 313, based on the receiving decoding information 131 transmitted from the receiving side moving image decoding device 12.

Further, the coding control unit 320 outputs coding start information 34 to the transcode start judging unit 321, based on the receiving decoding information 131 transmitted from the receiving side moving image decoding device 12.

The intra-frame/inter-frame prediction coding selector switches 309 and 310, the DCT 311, the quantizer 312 and the variable length coding device 313 change operations so as to perform intra-frame coding to the first frame right after receiving the coding type control information 33, based on the coding type control information 33 received from the coding control unit 320.

The transcode start judging unit 321 outputs a moving image signal 123 outputted from the adder 207 to the coding unit 32 based on the coding start information 34 received from the coding control unit 320 so as to start transcoding.

The transcoder 3 according to the second embodiment of the present invention starts operation when the coding start information 34 is inputted from the coding control unit 320, performs intra-frame coding to the first frame after starting the operation, and performs inter-frame prediction coding to the subsequent frames. Then, the transcoder 3 transmits the compression-coded bit stream as a transmitting coded bit stream to the receiving side moving image decoding device 12.

Therefore, according to the second embodiment of the present invention, the receiving side moving image decoding device 12 can first perform decoding processing of the intra-frame coded bit stream, and then perform decoding processing of the subsequent, inter-frame prediction coded bit streams. Therefore, it is possible to decode all bit streams transmitted from the transcoder 3 securely, without degrading the picture quality.

Next, referring to FIGS. 1 and 4, a transcoder 4 according to a third embodiment of the present invention will be described in detail.

Figure 4:
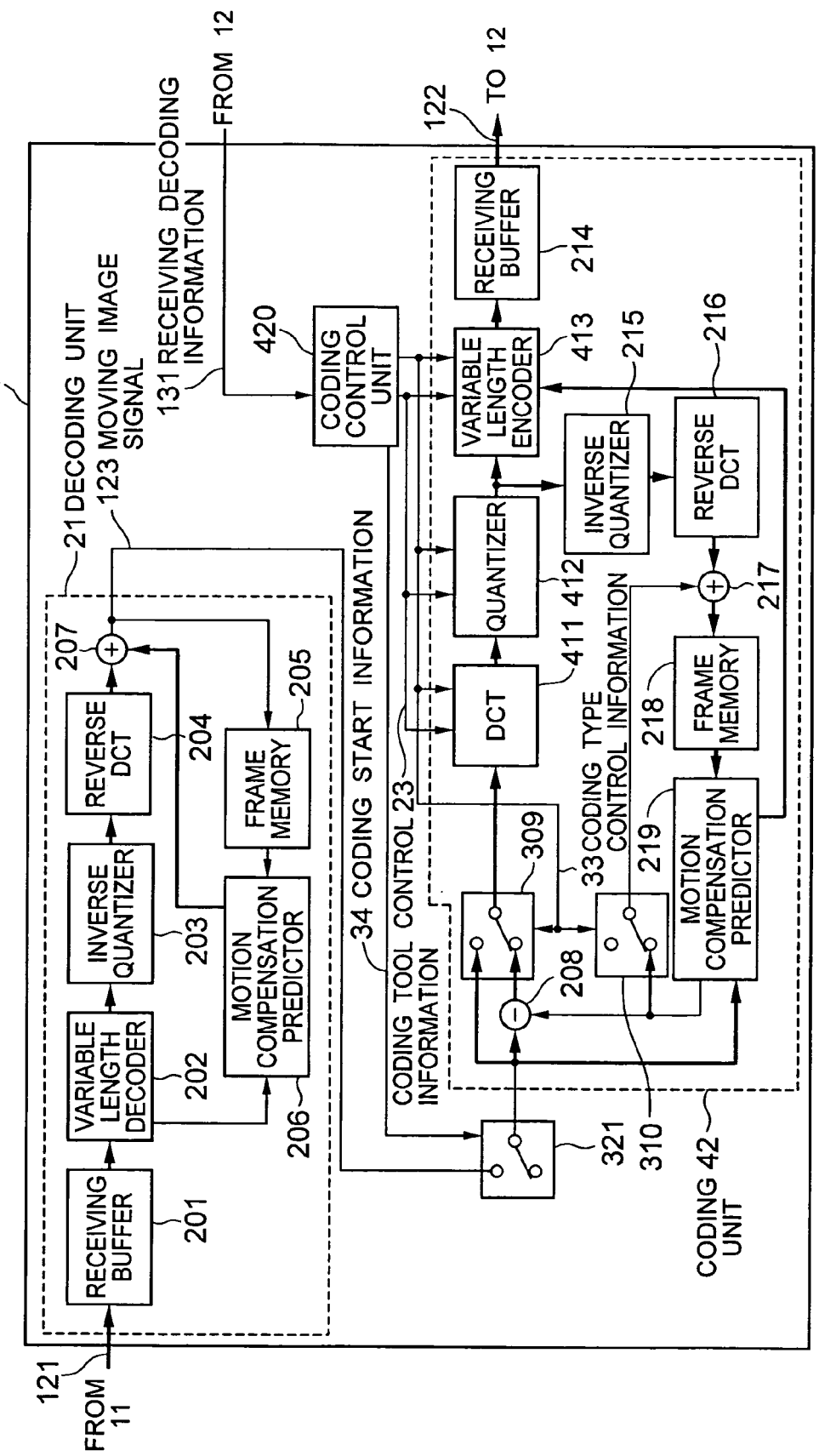
FIG. 4 is a block diagram showing a moving image compression-coding system conversion device (transcoder) according to a third embodiment of the present invention.

FIG. 4 shows the detailed configuration of the transcoder 4 in the third embodiment of the present invention. The transcoder 4 shown in FIG. 4 is different from that of the second embodiment shown in FIG. 3 in the configurations and operations of the coding unit and the coding control unit as described later. Other configurations operate similarly to the transcoder 3 of the second embodiment shown in FIG. 3. Therefore, the coding unit and the coding control unit shown in FIG. 4 are denoted by reference numerals 42 and 420 respectively, different from those shown in FIG. 3. Note that those having the similar functions to those of the transcoder 3 of the second embodiment are denoted by the same reference numerals, and the explanations thereof are omitted for simplification.

The coding unit 42 operates similarly to the coding unit 32 shown in FIG. 3, except that operations (configurations) of a DCT, a quantizer and a variable length encoder are different as described later. Therefore, the DCT, the quantizer and the variable length encoder are denoted by reference numerals 411, 412 and 413, respectively.

The coding control unit 420 selects a parameter for compression-coding used in the receiving side moving image decoding device 12, based on the receiving decoding information 131 transmitted from the receiving side moving image decoding device 12. Then, based on the result of selection, the coding control unit 420 outputs the coding tool control information 23 to the DCT 411, the quantizer 412 and the variable length encoder 413, respectively.

Further, the coding controller 420 outputs the coding type control information 33 to the intra-frame/inter-frame prediction coding selector switches 309 and 310, the DCT 411 and the quantizer 412 and the variable length encoder 413, based on the receiving decoding information 131 transmitted from the receiving side moving image decoding device 12.

Further, based on the receiving decoding information 131 transmitted from the receiving side moving image decoding device 12, the coding control unit 420 outputs the coding start information 34 to the transcode start judging unit 321.

The DCT 411, the quantizer 412 and the variable length encoder 413 change the operations based on the coding tool control information 23 received from the coding control unit 420.

Further, the DCT 411, the quantizer 412 and the variable length encoder 413 change operations so as to perform intra-frame coding to the first frame right after receiving the coding type control information 33, based on the coding type control information 33 received from the coding control unit 420.

As parameters for compression-coding included in the coding tool control information 23 outputted from the coding control unit 420, if the moving image compression-coding system adopted by the receiving side moving image decoding device 12 is MPEG-4 for example, at least one of plural parameters included in DCI such as a value of aspect_ratio_info or vop_time_increment_resolution, in addition to whether at least one of coding tools such as Resync Marker, Data Partitioning, and Reversible VLC being used, may be used.

The transcoder 4 according to the third embodiment of the present invention can transmit a coded bit stream 122 corresponding to a parameter for compression coding of the moving image compression system adopted by the receiving side moving image decoding device 12 (FIG. 1). As a result, the receiving side moving image decoding device 12 can decode and reproduce the received coded bit stream 122. This is because the transcoder 4 receives the receiving decoding information 131 from the receiving side moving image decoding device 12, whereby it is possible to know a parameter for compression-coding of the moving image compression system adopted by each receiving side moving image decoding device 12.

Further, the transcoder 4 according to the third embodiment of the present invention can transmit a transmitting coded bit stream 122, which can be decoded by the respective receiving side moving image decoding devices 12, from one transcoder 4 to a plurality of receiving side moving image decoding devices 12 in which parameters of compression-coding are different, even when the same moving image compression coding system is adopted by the respective receiving side moving image decoding devices 12 but the parameters for compression coding is different. This is because the trascoder 4 receives the receiving decoding information 131 from a plurality of receiving side moving image decoding device 12 so as to flexibly operate by obtaining information of the parameter for compression-coding of the moving image compression system adopted by the respective receiving side moving image decoding device 12.

Further, the transcoder 4 according to the third embodiment of the present invention is capable of correctly decoding and reproducing the first frame which is intra-frame coded and the subsequent frames which are inter-frame prediction coded by the receiving side moving image decoding device 12. This is because the transcoder 4 starts transcoding after receiving the receiving decoding information 131 from the receiving side moving image decoding device 12, and performs intra-frame coding to the first frame starting the transcoding.

Further, the transcoder 4 according to the third embodiment of the present invention is capable of selecting a parameter (coding tool, etc.) used by the receiving side moving image decoding device 12 for decoding. Therefore, it is possible to reduce necessary processing or secured memory for cope with all parameters.

Next, referring to FIGS. 1 and 5, a transcoder 5 according to a fourth embodiment of the present invention will be described in detail.

Figure 5:
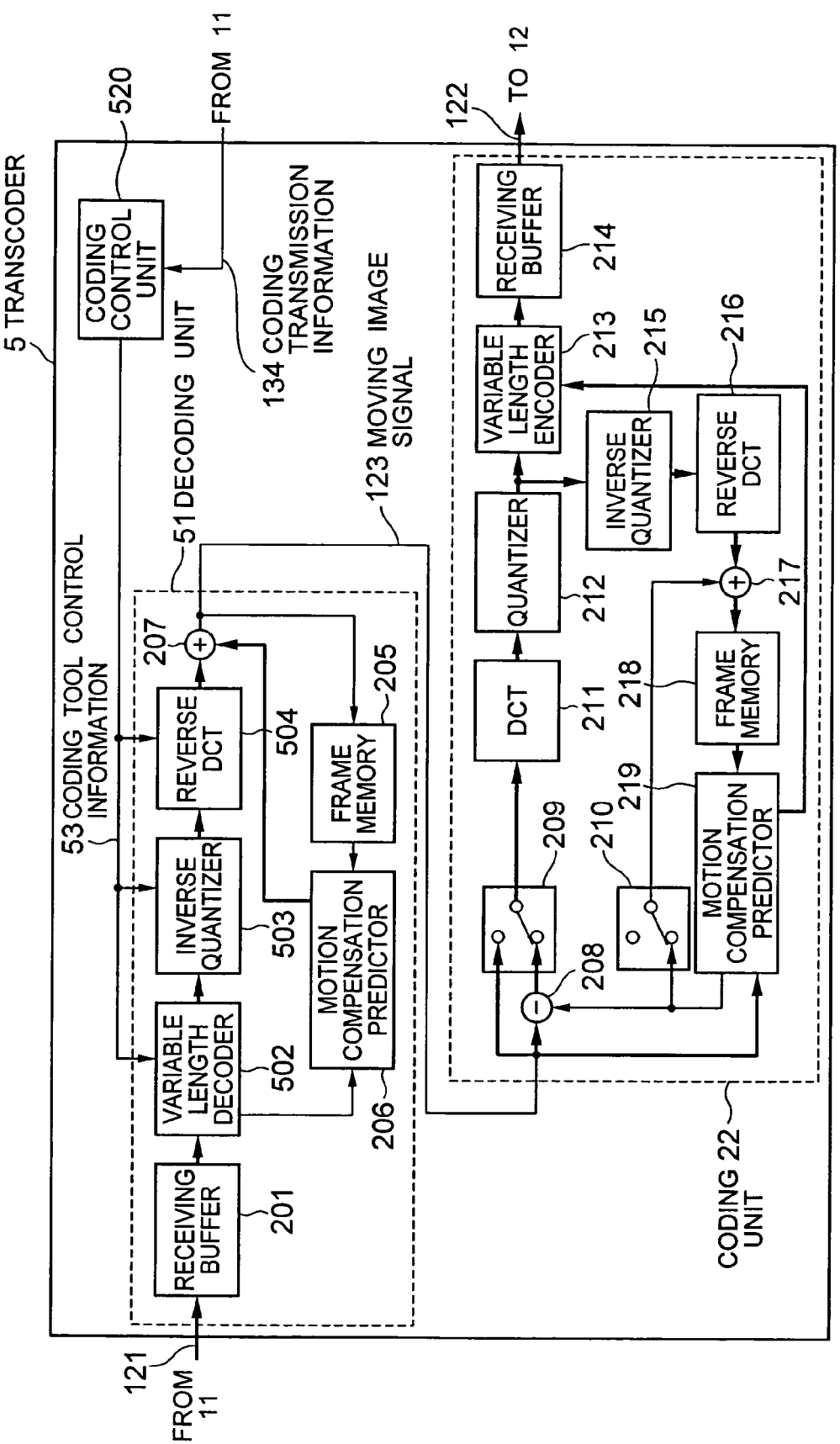
FIG. 5 is a block diagram showing a moving image compression-coding system conversion device (transcoder) of a fourth embodiment of the present invention.

FIG. 5 shows the detailed configuration of the transcoder 5 in the fourth embodiment. The transcoder 5 shown in FIG. 5 operates similarly to the transcoder 2 of the first embodiment shown in FIG. 2, except that the configuration and the operation of a decoding unit is different as described later, and has a decoding control unit 520 instead of the coding control unit 220. Therefore, the decoding unit is denoted by the reference numeral 51. Those having similar functions to those of the transcoder 2 of the first embodiment are denoted by the same reference numerals, and their explanations are omitted for simplification.

The decoding unit 51 operates similarly to the decoding unit 21 shown in FIG. 2, except that the operations and the configurations of a variable length decoder, an inverse quantizer and a reverse DCT are different. Therefore, the variable length decoder, the inverse quantizer and the reverse DCT are denoted by the reference numerals 502, 503 and 504, respectively.

The decoding control unit 520 selects a parameter for compression coding used in the transmission side moving image coding device 11, based on the coding transmission information 134 transmitted from the transmission side moving image coding device 11. Then, based on the result of selection, the decoding control unit 520 outputs the coding tool control information 53 to the variable length decoder 502, the inverse quantizer 503 and the reverse DCT 504.

Upon receiving the coding tool control information 53 from the decoding control unit 520, the variable length decoder 502, the inverse quantizer 503 and the reverse DCT 504 change the operations according to the received coding tool control information 53.

Alternatively, upon receiving the coding tool control information 53 from the decoding control unit 520, the variable length decoder 502, the inverse quantizer 503 and the reverse DCT 504 may compare the parameter for compression-coding obtained from the receiving coded bit stream 121 with the received coding tool control information 53, and if there is a difference, change the operations according to the received coding tool control information 53.

The transcoder 5 according to the fourth embodiment of the present invention is capable of decoding a coded bit stream 121 corresponding to the parameter for compression-coding of the moving image compression system adopted by the transmission side moving image coding device 11 (FIG. 1). As a result, it can decode and reproduce the coded bit stream 122 received by the receiving side moving image decoding device 12 (FIG. 1). This is because, the transcoder 5 receives the coding transmission information 134 from the transmission side moving image coding device 11, to thereby know the parameter (whether coding tool or the like is used) for compression-coding of the moving image compression system adopted by the transmission side moving image coding device 11.

Further, the transcoder 5 according to the fourth embodiment of the present invention is capable of transmitting, from one transcoder 5, a transmitting coded bit stream 122 which can be decoded by a plurality of receiving side moving image decoding device 12 in which parameters of compression-coding are different, even when the transmission side moving image coding device 11 adopt the same moving image compression-coding system but the parameters for compression-coding are different. This is because the transcoder 5 receives the coding transmission information 134 from a plurality of transmission side moving image coding devices 11 to thereby obtain information about a parameter for compression-coding of the moving image compression system adopted by each transmission side moving image coding device 11 so as to operate flexibly.

Further, the transcoder 5 according to the fourth embodiment of the present invention is capable of selecting a parameter for compression-coding adopted by the transmission side moving image coding device 11. Therefore, it is possible to reduce necessary processing or secured memory in order to cope with all parameters.

Although either one of the coding control unit 320 shown in FIG. 3 and the decoding control unit 520 shown in FIG. 5 is used, both of the coding control unit 320 shown in FIG. 3 and the decoding control unit 520 shown in FIG. 5 may be used together.

It is obvious that the present invention is not limited to the embodiments described above, and may be changed in various ways without departing the scope of the present invention.

INDUSTRIAL AVAILABILITY

As described above, the present invention has the following effects.

A first effect of the present invention is, irrespective of a coding tool of the moving image compression-coding system in a receiving side moving image decoding device, to enable to output, from a transcoder, a coded bit stream which can be decoded and reproduced by the receiving side moving image decoding device. A second effect of the present invention is to enable to output, from a transcoder, a coded bit stream, in which the first frame is intra-frame coded and the subsequent frames are inter-frame prediction coded, enabling a receiving side moving image decoding device to correctly decode and reproduce the coded bit stream right after starting the decoding and reproducing.

What is claimed is:

1. A moving image compression-coding system conversion device for mutually converting a coded bit stream between a transmission side moving image coding device and a receiver side moving image decoding device having different moving image coding-decoding systems, the moving image compression-coding system conversion device comprising:
   a decoding unit for decoding a moving image signal, which is compression-coded, outputted from the transmission side moving image coding device;
   a coding control unit for setting a parameter for compression-coding based on received decoding information outputted from the receiver side moving image decoding device; and
   a coding unit for compression-coding the moving image signal decoded by the decoding unit by using the parameter for compression-coding outputted from the coding control unit, wherein
   the coding unit starts operation when control information outputted from the coding control unit is inputted, performs intra-frame coding to a first frame after starting the operation, and performs inter-frame prediction coding to a subsequent frame.

2. The moving image compression-coding system conversion device, as claimed in claim 1, further comprising a judging unit, wherein the judging unit starts operation when the receiving decoding information outputted from the receiver side moving image decoding device is inputted, and outputs the moving image signal decoded in the decoding unit to the coding unit.

3. The moving image compression-coding system conversion device, as claimed in claim 1, wherein when MPEG-4 is used as the moving image compression-coding system, data of DCI is used as a parameter for compression-coding.

4. The moving image compression-coding system conversion device, as claimed in claim 2, wherein when MPEG-4 is used as the moving image compression-coding system, data of DCI is used as a parameter for compression-coding.

5. The moving image compression-coding system conversion device, as claimed in claim 1, wherein when MPEG-4 is used as the moving image compression-coding system, at least one information of a plurality of parameters included in DCI such as whether Resync Marker being used, whether Data Partitioning being used, whether Reversible VLC being used, a value of aspect ratio info, and a value of vop_time_increment_resolution is used as a parameter for compression-coding.

6. The moving image compression-coding system conversion device, as claimed in claim 1, wherein when MPEG-4 is used as the moving image compression-coding system, at least one information of a plurality of parameters included in DCI such as whether Resync Marker being used, whether Data Partitioning being used, whether Reversible VLC being used, a value of aspect_ratio_info, and a value of vop_time_increment_resolution is used as a parameter for compression-coding.

7. The moving image compression-coding system conversion device, as claimed in claim 1, wherein the receiving decoding information transmitted from the receiver side moving image decoding device is transmitted by using ITU-T recommendation H.245 protocol.

8. The moving image compression-coding system conversion device, as claimed in claim 2, wherein the receiving decoding information transmitted from the receiver side moving image decoding device is transmitted by using ITU-T recommendation H.245 protocol.

9. The moving image compression-coding system conversion device, as claimed in claim 1, wherein the receiving decoding information transmitted from the receiver side moving image decoding device is transmitted by using SDP which is IETF recommendation RFC 2327.

10. The moving image compression-coding system conversion device, as claimed in claim 2, wherein the receiving decoding information transmitted from the receiver side moving image decoding device is transmitted by using SDP which is IETF recommendation RFC 2327.

11. The moving image compression-coding system conversion device, as claimed in claim 1, further comprising a decoding control unit, in addition to the coding control unit, wherein
    the decoding control unit sets a parameter for compression-coding included in coding transmission information outputted from the transmission side moving image coding device; and
    the decoding unit decodes the moving image signal, compression-coded, outputted from the transmission side coding device by using the parameter for compression-coding outputted from the decoding control unit.

12. The moving image compression-coding system conversion device, as claimed in claim 11, wherein when MPEG-4 is used as the moving image compression-coding system, data of DCI is used as a parameter for compression-coding.

13. The moving image compression-coding system conversion device, as claimed in claim 11, wherein when MPEG-4 is used as the moving image compression-coding system, at least one information of a plurality of parameters included in DCI such as whether Resync Marker being used, whether Data Partitioning being used, whether Reversible VLC being used, a value of aspect_ratio_info, and a value of vop_time_increment_resolution is used as a parameter for compression-coding.

14. The moving image compression-coding system conversion device, as claimed in claim 11, wherein MPEG-4 is used as the moving image compression-coding system of the decoding unit, control information obtained from a receiving coded bit stream is compared with control information according to the moving image compression-coding system and when there is a difference, control information according to the moving image compression-coding system is used.

15. The moving image compression-coding system conversion device, as claimed in claim 11, wherein the parameter for compression-coding system from the transmission side moving image coding device is transmitted by using ITU-T recommendation H.245 protocol.

16. The moving image compression-coding system conversion device, as claimed in claim 11, wherein the parameter for compression-coding system from the transmission side moving image coding device is transmitted by using SDP which is IETF recommendation RFC2327.

17. A moving image communication system comprising:
a transmission side moving image coding device and a receiver side moving image decoding device having different moving image compression systems; and
a moving image compression-coding system conversion device according to claim 1 for mutually converting a coded bit stream between the transmission side moving image coding device and the receiver side moving image decoding device.

18. A moving image communication system comprising:
a transmission side moving image coding device and a receiver side moving image decoding device having different moving image compression systems; and
a moving image compression-coding system conversion device according to claim 2 for mutually converting a coded bit stream between the transmission side moving image coding device and the receiver side moving image decoding device.

19. A moving image communication system comprising:
a transmission side moving image coding device and a receiver side moving image decoding device having different moving image compression systems; and
a moving image compression-coding system conversion device according to claim 11 for mutually converting a coded bit stream between the transmission side moving image coding device and the receiver side moving image decoding device.

* * * * *